US011449638B2

(12) United States Patent
Ng et al.

(10) Patent No.: US 11,449,638 B2
(45) Date of Patent: Sep. 20, 2022

(54) ASSISTING A SCANNING SESSION

(71) Applicant: ENTIT SOFTWARE LLC, Sanford, NC (US)

(72) Inventors: Ming Sum Sam Ng, Hong Kong (CN); Sasi Siddharth Muthurajan, Cambridge, MA (US); Barak Raz, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 713 days.

(21) Appl. No.: 16/084,081

(22) PCT Filed: Mar. 18, 2016

(86) PCT No.: PCT/US2016/023120
§ 371 (c)(1),
(2) Date: Sep. 11, 2018

(87) PCT Pub. No.: WO2017/160309
PCT Pub. Date: Sep. 21, 2017

(65) Prior Publication Data
US 2020/0293673 A1    Sep. 17, 2020

(51) Int. Cl.
| | |
|---|---|
| *G06F 21/50* | (2013.01) |
| *G06F 21/62* | (2013.01) |
| *G06F 9/54* | (2006.01) |
| *G06F 21/44* | (2013.01) |
| *H04L 41/046* | (2022.01) |
| *H04L 41/28* | (2022.01) |
| *H04L 9/40* | (2022.01) |

(52) U.S. Cl.
CPC ............ *G06F 21/629* (2013.01); *G06F 9/546* (2013.01); *G06F 21/44* (2013.01); *H04L 41/046* (2013.01); *H04L 41/28* (2013.01); *H04L 63/1433* (2013.01)

(58) Field of Classification Search
CPC ........ G06F 9/546; G06F 21/44; G06F 51/629; H04L 41/046; H04L 41/28; H04L 63/1433
See application file for complete search history.

(56) References Cited

U.S. PATENT DOCUMENTS

| | | |
|---|---|---|
| 8,051,486 B2 | 11/2011 | Beresniewicz |
| 8,572,750 B2 | 10/2013 | Patel et al. |
| 8,695,098 B2 | 4/2014 | Pistoia et al. |
| 8,904,358 B1* | 12/2014 | Peri-Glass .......... G06F 11/3608 717/126 |
| 9,215,247 B2 | 12/2015 | Chess et al. |

(Continued)

OTHER PUBLICATIONS

International Searching Authority., International Search Report and Written Opinion dated Dec. 6, 2016 for PCT Application No. PCT/US2016/023120 Filed Mar. 18, 2016, 13 pages.

(Continued)

*Primary Examiner* — Brian P Cox
(74) *Attorney, Agent, or Firm* — Sheridan Ross P.C.

(57) ABSTRACT

Examples herein disclose via use of a physical processor, detecting a specific application programming interface (API) call to interact with an application running on a production server. Based on the detection of the specific API call, die examples assist, using the physical processor, a scanning session based on the specific API call Using the physical processor, the examples identify a modification to the application based on the scanning session.

20 Claims, 6 Drawing Sheets

(56) References Cited

U.S. PATENT DOCUMENTS

| | | | |
|---|---|---|---|
| 10,320,813 B1* | 6/2019 | Ahmed | H04L 63/1441 |
| 2005/0198527 A1* | 9/2005 | Johnson | H04L 63/1441 |
| | | | 726/22 |
| 2011/0119689 A1 | 5/2011 | McCrae et al. | |
| 2011/0307955 A1 | 12/2011 | Kaplan et al. | |
| 2013/0086682 A1 | 4/2013 | Mahaffey et al. | |
| 2013/0160131 A1* | 6/2013 | Madou | G06F 21/54 |
| | | | 726/25 |
| 2014/0082739 A1* | 3/2014 | Chess | G06F 11/0793 |
| | | | 726/25 |
| 2014/0245460 A1* | 8/2014 | Sum | G06F 11/3676 |
| | | | 726/28 |
| 2015/0026455 A1 | 1/2015 | Enderwick et al. | |
| 2015/0178497 A1 | 6/2015 | Lukacs et al. | |
| 2015/0222504 A1* | 8/2015 | Srivastava | G06F 11/3041 |
| | | | 709/224 |
| 2015/0248559 A1* | 9/2015 | Madou | G06F 21/577 |
| | | | 726/25 |
| 2015/0379273 A1* | 12/2015 | Chess | G06F 21/577 |
| | | | 726/25 |
| 2017/0046253 A1* | 2/2017 | Ganda | G06F 11/3692 |
| 2017/0223042 A1* | 8/2017 | Muthurajan | H04L 51/12 |

OTHER PUBLICATIONS

Montpas, M-A., Security Advisory: Object Injection Vulnerability in Woocommerce, Sucuti Blgo, Jun. 10, 2016, 18 pages.

Unknown, About Scan My Server, Beyond Security, Feb. 10, 2016, <https://scanmyserver.com/about.html>, 2 pages.

Unknown, Open Source Testing Tools for Web Applications: Website Vulnerability Scanner and Recon Tools, Oct. 27, 2011, <http://searchsecurity.techtarget.com/answer/Open-source-testing-tools-for-Web-applications-Website-vulnerability-scanner-and-recon-tools>, 9 pages.

\* cited by examiner

ASSISTING A SCANNING SESSION

BACKGROUND

A web application is a software application which is hosted and executed by one or more production servers to run in a web browser. Devices communication with the web application using application programming interfaces (APIs). An API comprises a set of API calls to interact with the web application.

BRIEF DESCRIPTION OF THE DRAWINGS

In the accompanying drawings, like numerals refer to like components or blocks. The following detailed description references the drawings, wherein.

DETAILED DESCRIPTION

Figure 1:
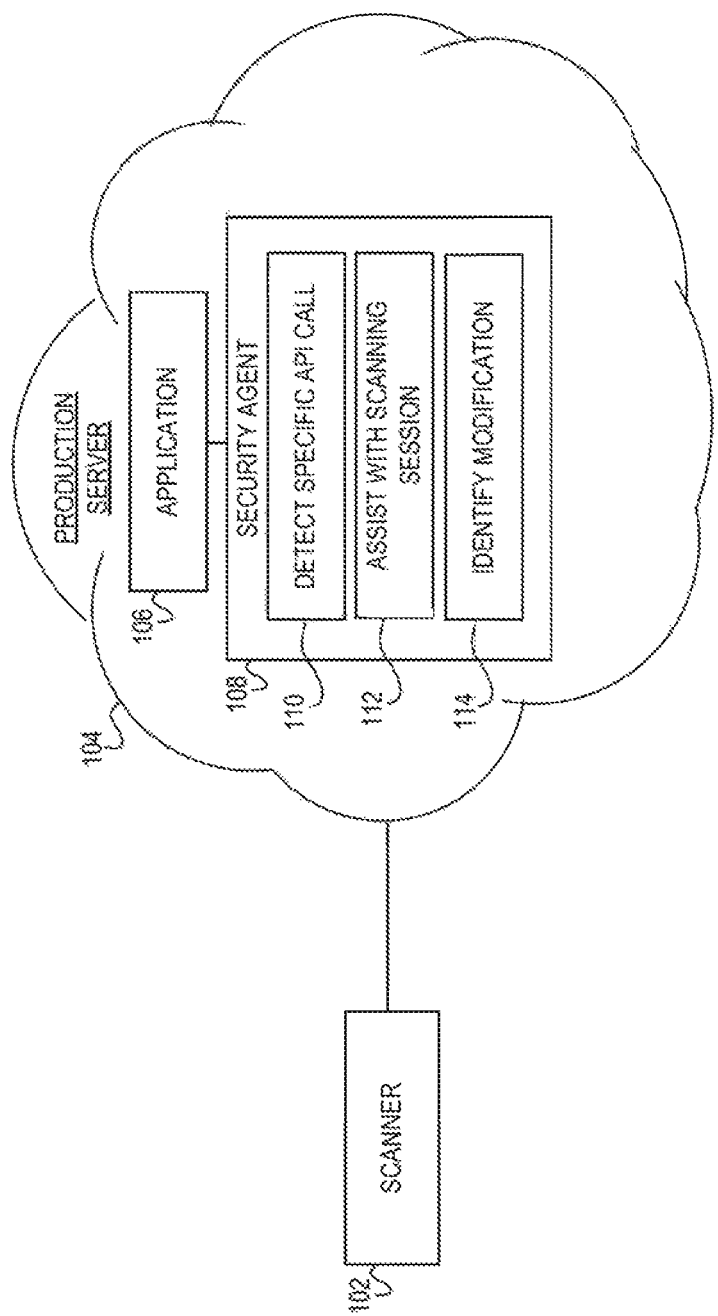
FIG. 1 is a block diagram of an example system including a scanner and production server to interact with an application for detection of a specific API call in accordance with the present disclosure.

A web application, also referred to as the application, may be susceptible to security attacks which may lead to a compromised application. Web application scanning is a process to identify potential security vulnerabilities in the application. The potential security vulnerabilities, as discussed herein, may include an issue related to the application which can cause security implications. Examples of potential security vulnerabilities may include structured query language (SQL) injection, cross-site scripting, modification of source code, modification of data, etc.

There are several side effects to the scanning process including unwanted modifying of the production environment and triggering unnecessary tasks. The first side effect, modification of the production environment, may include leaving garbage data in a database, modifying a data file during the scanning process, affecting data seen by a user of the application, etc. For example, scanning a live blogging web application which may leave thousands of spam like comments viewable by users of the blog. The second side effect, triggering unnecessary tasks, may include, for example, generating a larger number of email notifications and posting unnecessary data to a backend of a server, among others. These side effects may slow down the processing of the application and adversely affect the usability of the application.

To address these issues, examples disclosed herein can detect a potential security vulnerability during a scanning session without affecting the processing and usability of the application. As such, the examples detect a particular API call to interact with the application running on a production server. Based on the detection of the particular API call, the examples assist with a scanning session of the application. By assisting with die scanning session of the application, the examples may identify a modification to the application which may represent a potential security vulnerability. By monitoring and detecting the particular API calls, the impact incurred on the production server may be minimized without adversely affecting functionality of the scanning session.

Additionally, the examples allow a dynamic scanning session to detect the potential security vulnerabilities in the production environment while minimizing disruption to the data of the application.

The following detailed description refers to the accompanied figures. Wherever possible, the same reference numbers are used in the figures and the following description to refer to the same or similar parts. It is to be expressly understood, however, that the figures are for the purpose of illustration and description only. While several examples are described throughout, modification, adaptions, and other implementations are possible. Accordingly, the following detailed description is not meant to limit the disclosed examples, rather it is meant to provide proper scope of the disclosed examples and may be defined by the appended claims.

FIG. 1 illustrates an example system including a scanner 102 and a production server 104. The production server 104 hosts and rum application 106. The system in FIG. 1 illustrates a production environment that could include a network of multiple geographically distributed machines in data centers, virtual machines, other devices that facilitate the functionality described herein, or any combination thereof. Although FIG. 1 illustrates components 102, 106, and 108, implementations should not be limited as the system may also include a database, redundant resources, and or other resources.

The scanner 102 transmits a signal to the production server 104 for commencement of a scanning session. The signal may be in the form of a data packet, may be an electronic signal, and/or other type of signal. For example, a signal in the form of a data packet may include information identifying the scanner 102 as authorized to perform the scanning session to the security agent 108. The data packet may include information such as an internet protocol (IP) address which identifies the scanner 102. In this regard, the scanner 102 provides the authorization to the security agent 108 for performing the scanning session on the application 106.

The scanner 102 may implement a scanning session by performing a dynamic analysis on the application 106 by emulating an attacker. For example, the scanner 102 may emulate an attacker by sending attacks over a network connection to application 106. The security agent 108, in turn, may monitor the behavior of the application 106 to identify any modifications which may indicate a vulnerability to the scanner 102. In particular, during the the scanning session, the security agent 108 may track various API calls which interact with application 106 to determine if any modifications have occurred. A modification may represent an unexpected behavior of the application 106 which may signal to the scanner 102 a potential vulnerability. The security agent 108 may communicate information about the identified modifications to the scanner 102. The scanner 102 may use this information to identify the potential vulnerability and improve the qualify and performance of the scanning session.

The security agent 108 may track various API calls by monitoring API calls executed by a runtime agent for the application. The security agent 108 may determine whether an individual API call warrants assisted scanning. Based on detection of the specific API call, the security agent 108 proceeds to assist with the scanning session for identification of a modification.

In some examples, the security agent 108 may determine whether an individual API call warrants assisted scanning by determining whether a particular API call is associated with assisting scanning. For example, a non-transitory storage medium communicably coupled to the security agent 108 and/or the production server 102 may comprise a list of APIs that warrant assisting scanning. In some examples, the list may be pre-defined, may be obtained from an administrator of the application and or the production server 102, may be customized for the application, may be machine learned based on behaviors of the application, may be determined based on any combination thereof, and/or may otherwise be determined. In some examples, the list of APIs may comprise APIs related to file modification, database connection, related to email, etc.

The scanner 102 may comprise a combination of hardware and programming that may be running on a different server from the production server 104 and as such may include instructions (e.g., stored on a machine-readable medium) that, when executed (e.g., by the different server), implement the functionality of the scanner 102. Alternatively, or in addition, scanner 102 may include electronic circuitry (i.e., hardware) that implements the functionality of scanner 102. Although illustrated as a separate component to production server 104, this was done for purposes of illustration as the scanner 102 may be considered part of production server 104.

The production server 104, as pan of the production environment, hosts, executes, and runs application 104. Implementations of production server 104 include, by way of example, a Local Area Network (LAN) server, web server, application server, cloud server, network server, file server, data server, or other type of computing device capable hosting and running the application 106.

The application 106 is a program or group of programs designed for user(s) interaction. For example, application 106 may comprise a web-based application to refer to the program or group of programs being accessed over a network connection, such as hypertext text transfer protocol (HTTP). Implementations of the application 106 include, by way of example, content access software, media development software, educational software, information worker software, business software, enterprise infrastructure software, enterprise software, application suite, among others.

The security agent 108 is an engine residing at the production server 104. The security agent 108, based on the performance of the scanning session by the scanner 102, monitors various API calls. The security agent 108 may include, by way of example, instructions (e.g., stored on a machine-readable medium) that, when executed (e.g., by a processor and/or controller), implement the functionality of security agent 108. Alternatively, or in addition, the security agent 108 may include electronic circuitry (i.e., hardware) that implements the functionality of security agent 108 to detect the specific API call and assist with the scanning session for identification of the modification to application 106.

The security agent 108 may perform functionality set forth in engines 110-114. At engines 110-114, the security agent 108 detects the specific API call, the detection of the specific API call signals for the security agent 108 to assist with the scanning session for identification of the modification within the application 106. Specifically, at engine 110 the security agent 108 tracks various API calls which interact with the application 106 for detection of the specific API call.

The process of assisting with the scanning session may be dependent on the specific API call detected at engine 110. Alternatively, the assistance of the scanning session may be related to the functionality of the detected API call. In implementations, the detected API call may be related to a file modification, a database connection, and/or email. The process for assisting with the scanning session may depend on one of the specific listed API calls. For example, the specific API call may include the file modification API. In this example, the assistance of the scanning session may include skipping the execution of the file modification API call and reporting the skipped execution file modification API call to the scanner 102. In an alternate example, the assistance of the scanning session may include backing up a file affected by the file modification API call, executing the file modification API call, and reverting the modified file to a state prior to execution of the API call. In another example, the specific API may be related to the database connection. In this example, the database connection API call may be redirected from an originally intended database to a testing database for execution. In an alternative example, the database connection API call is executed which modifies the intended database and the modified database is reverted to a state prior to execution of the API call. In a further example, the specific API call may be related to email. In this example, the email API call may be intercepted and redirected from the originally intended email address to a different email address.

At engine 114, during the scanning session performed by the scanner 102, the security agent 108 identifies the modification to application 106. Responsive to this identification, the security agent 108 can alert the scanner 102 to the modification. Implementations of engines 110-114 may include, by way of example, instructions (e.g., stored on a machine-readable medium) that, when executed (e.g., by the security agent 108), implement the functionality of engines 110-114. Alternatively, or in addition, the engines 110-114 may include electronic circuitry (i.e., hardware) that implements the functionality of engines 110-114.

Figure 2:
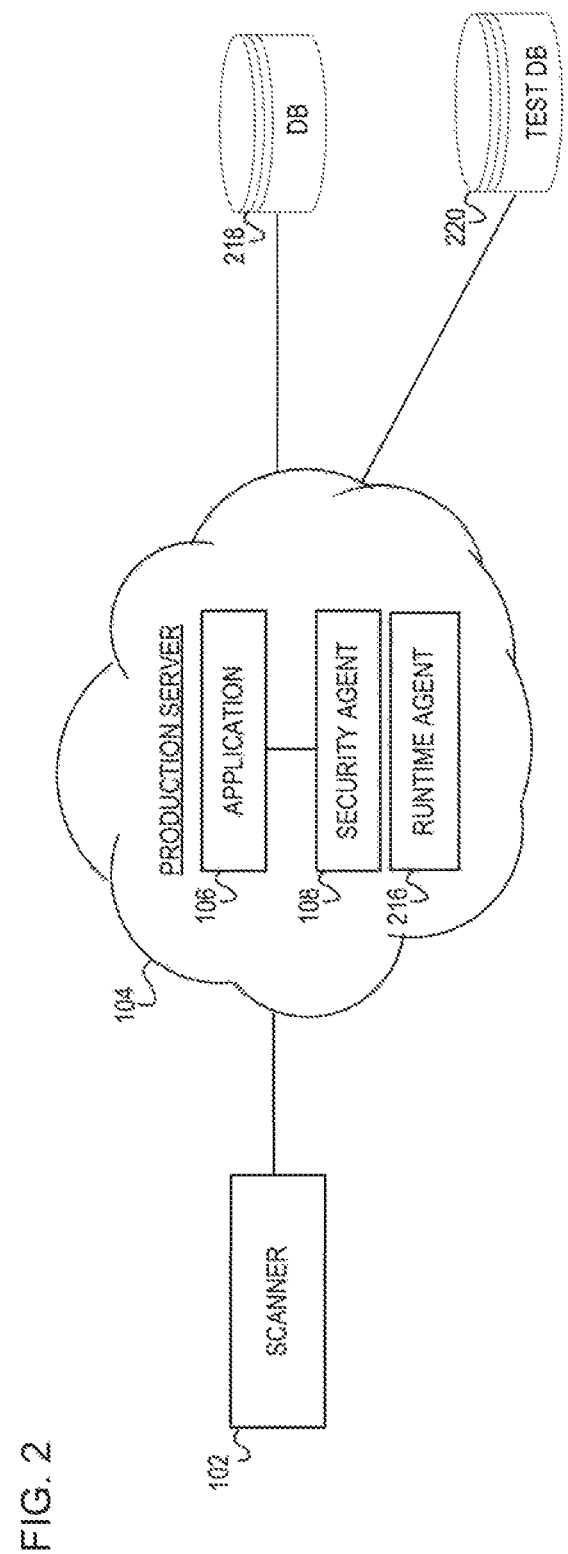
FIG. 2 is an illustration of example system including a scanner and a production server to interact with an application in accordance with the present disclosure.

FIG. 2 illustrates an example system including a scanner 102 to communicate with security agent 108 to perform a scanning session on application 106 running on production server 104. Based on the scanner 102 performing the scanning session of the application 106, the security agent 108 detects a specific API call to interact with the application 106. Based on the detection of this specific API call, the security agent 108 proceeds to assist with the scanning session. In one implementation, the assistance of the scanning session by the security agent 108 includes intercepting the specific API call and transmitting the API call to a redundant resource, such as a test database 220 for execution of the specific API call. In this implementation, the security agent 108 redirects the specific API from the originally intended resource, such as database 218 that would originally execute the specific API call, to the redundant resource, such as test database 220.

Test database 220 may comprise a redundant resource for execution of the detected specific API. Implementations of the redundant resource include a virtual component, physical component, or combination thereof for execution of the detected specific API. In one implementation, the security agent 108 copies at least a portion of database 218 upon the detection of the specific API call. In this implementation, the security agent 108 maintains a mapping list of addresses to the original intended resource and the redundant resource so the specific API call may be routed, accordingly. Thus upon the detection of the specific API call, the security agent 108 references the mapping list to identify the address of the redundant resource for execution of the specific API call.

A runtime agent 216 executes application 106, outside of the scanning session performed by scanner 102. The runtime agent 216 executes source code of the application 106 to provide the functionality of the application 106 to user(s). In that capacity, the runtime agent 216 may execute API calls to execute functionality of the application 106. The security agent 108 may intercept API calls executed by the runtime agent 216 to determine whether to assist with scanning. Implementations of the runtime agent 216 may include, by way of example, instructions (e.g., stored on a machine-readable medium) that, when executed (e.g., by a processor and/or controller), implement the functionality of runtime agent 216. Alternatively, or in addition, the runtime agent 216 may include electronic circuitry (i.e., hardware) that implements the functionality of 216.

Figure 3:
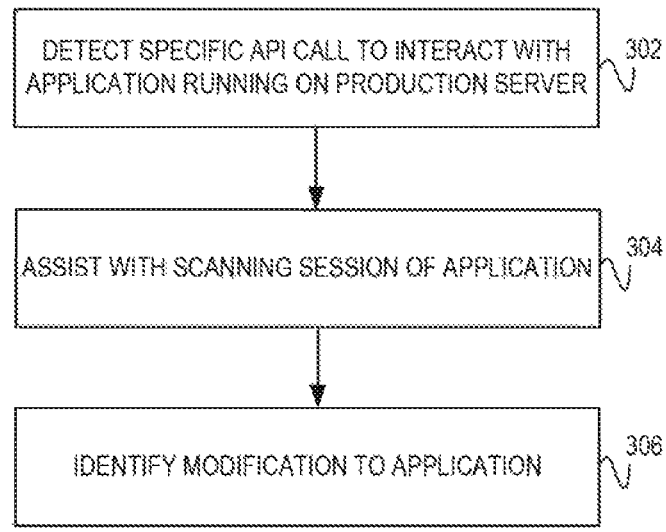
FIG. 3 is a flowchart of an example method executable by a computing device to assist with a scanning session for identification of a modification to an application in accordance with the present disclosure.
Figure 4:
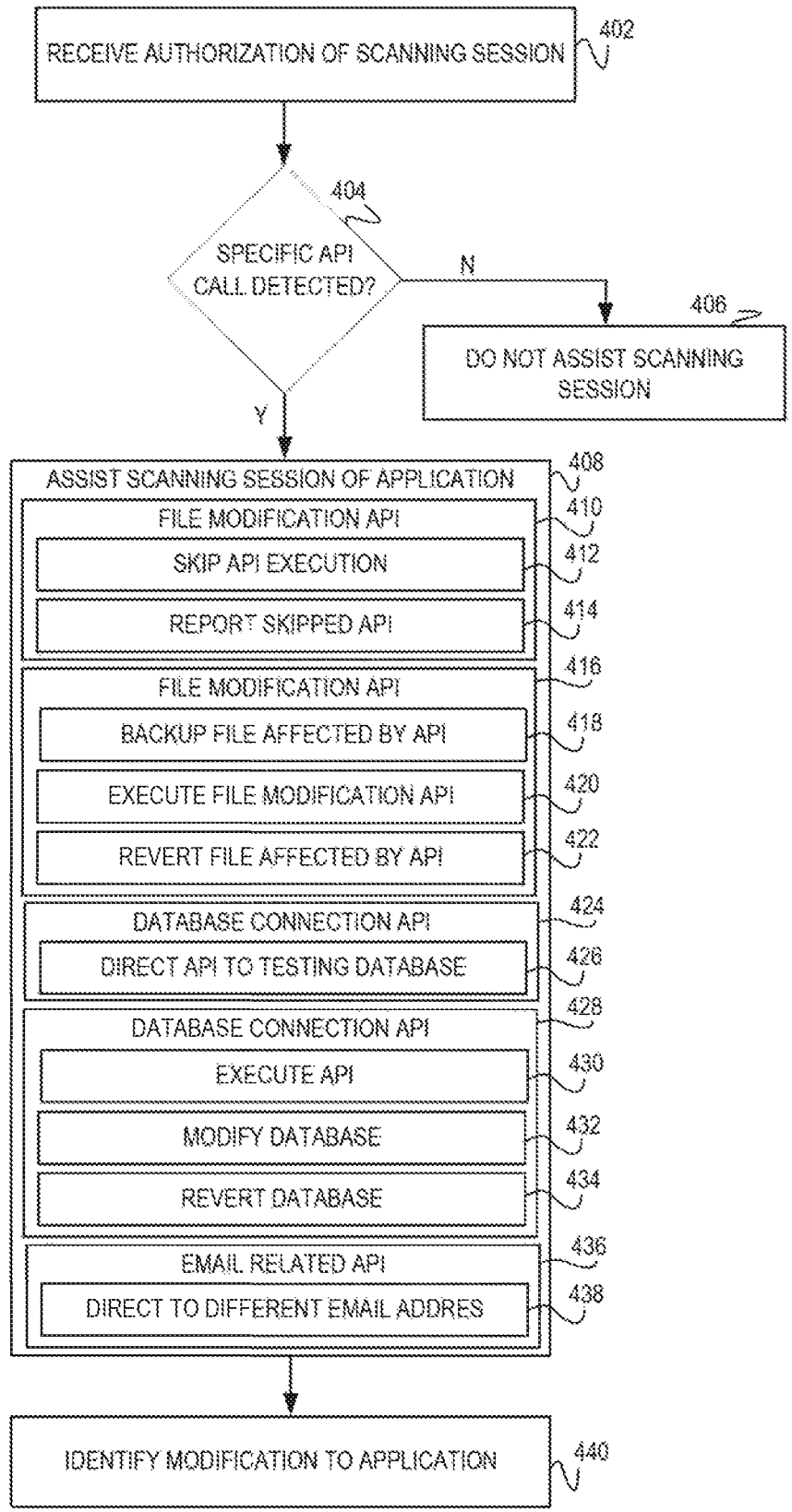
FIG. 4 is a flowchart of an example method executable by a computing device to assist with a scanning session of an application based on a detected API call in accordance with the present disclosure.

Referring now to FIGS. 3 and 4, example flowcharts are illustrated in accordance with various examples of the present disclosure. The flowcharts represent processes that may be utilized in conjunction with various systems and devices as discussed with reference to the preceding figures. While illustrated in a particular order, the flowcharts are not intended to be so limited. Rather, it is expressly contemplated that various processes may occur in different orders and/or simultaneously with other processes than those illustrated.

FIG. 3 is a flowchart of an example method to identify a modification to an application running on a production server. The method is executable by a computing device for identification of the modification. The computing device detects a specific API call among various API calls which interact with the application running on the production server. Upon the detection of the specific API call, the computing device assists with a scanning session of the application. Based on the scanning session, the computing device proceeds to identify the modification to the application. In discussing FIG. 3, references may be made to the components in FIGS. 1-2 to provide contextual examples. In one implementation, the security agent 108 executes operations 302-306 to detect the specific API call. Although FIG. 3 is described as implemented by the security agent 108, it may be executable on other suitable hardware components. For example, FIG. 3 may be implemented in the form of executable instructions on a machine-readable storage medium 504 and 604 as in FIGS. 5-6.

At operation 302, the computing device monitors various API calls interacting with the application running on the production server. By monitoring the various API calls, the computing device detects the specific API call among the various API calls. The specific API call is a predetermined API call which signals to the computing device to assist with the scanning session. The computing device monitors the various API calls which are used to build and execute the application. In this manner, the computing device tracks each of the various API calls prior to execution. This allows the computing device to determine which API call is slated for execution. Responsive to determining the API call slated for execution, the computing device detects the specific API call which alerts the computing device to perform assistance with the scanning session. The API calls may include a set of routines, protocols, tools, and/or resources related to the execution and establishment of the application. As such, each of the API calls may be related to different functionality of the application. In implementations, the detected specific API call may be related to a file modification, database connection, email, etc. Each of these detected specific API calls represent a different type of API call. Depending on the detected specific API call, the computing device proceeds to assist the scanning session as at operation 304.

At operation 304, based on the detection of the specific API call, the computing device assists with the scanning session. The scanning session is initiated by a scanner prior to detection the specific API call. During the scanning session, various API calls may interact with the application. The computing device identifies the specific API call among the various API calls to proceed with assisting with the scanning session. Based on the assistance with the scanning session, the computing device identifies the modification to the application. The scanning session (as initiated by the scanner) may not have access to the application source code and thus detects the potential vulnerabilities by emulating an attack on the application. The course of action for performing the assisting the scanning session may be dependent on the type of the detected specific API call. In this implementation, the type of specific API call may be related to entail, database connection, file modification, etc. Each of the types of specific API calls implement a different course of action. This implementation is discussed in detail in the next figure.

At operation 306, the computing device identifies the modification to the application based on the scanning session at operation 304. The modification to the application is an unexpected change in the data of the application and or component in a production environment which hosts and runs the application. In a more specific implementation, the modification includes an unexpected behavior of the application. In this implementation, the computing device monitors and tracks the behaviors of the application. Thus by tracking the behaviors of the application, the computing device identifies an unexpected or unpredicted behavior. Identifying the unexpected or unpredicted behavior, the computing device identifies an anomaly in the application. Responsive to identification of the anomaly in the application, the computing device determines whether the modification is considered a security vulnerability for taking proactive measures against.

FIG. 4 is a flowchart of an example method to assist with a scanning session of an application based on a detected specific API call. The method is executable by a computing device to perform the assistance with the scanning session. The scanning session is implemented by a scanner transmitting a signal authorization which indicates to the computing device, a scanning, session may commence. The authorization may occur prior to the scanning session or during the scanning session. Upon receiving the signal authorization, the computing device monitors various API calls which interact with the application to detect a specific API call. Based on die detection the specific API call, the computing device proceeds to assist with the scanning session. Based on the detected API call, the computing device assists the scanner with the scanning session by performing at least one of the sets of operations 410-414, 416-422, 424-426, 428-434, and 436-438. For example, responsive to determining that the API call is related to file modification, the computing device proceeds to at least one of the sets of operations 410-414 or 416-422. Responsive to determining the API call is related to a database connection, the computing device proceeds to at least one of the sets operations 424-426 or 428-434. Responsive to determining the API call is related to an email, the computing device proceeds to the set of operations 436-438. The set of operations in which the computing device proceeds to depends on the specific API call to interact with the application and also with the functionalities the computing device may be capable of supporting. For example, responsive to the specific API call including the file modification, the computing device may have limited storage functionality. Thus, the computing device proceeds to the set of operations 410-414 may skip and report the file modification API. Although FIG. 4 illustrates API calls related to file modification, a database connection, and/or email, implementations are not meant to be limiting as the API calls may be related to a network connection among others. In discussing FIG. 4, references may be made to the components in FIGS. 1-2 to provide contextual examples. In one implementation, the security agent 108 executes a combination of operations 402-440 to perform the assistance of the scanning session. Although FIG. 4 is described as implemented by the security agent 108, it may be executable on other suitable components. For example, FIG. 4 may be implemented in the form of executable instructions on a machine-readable storage medium 504 and 604 as in FIGS. 5-6.

At operation 402, the computing device receives an authorization of the scanning session from a scanner. For example, the computing device may include the security agent 108 and scanner 102 as in FIG. 1. In one implementation, a scanner implements a scanning session and transmits a signal to the computing device of the scanning session. The computing device receives the communication from the scanner and may determine whether the scanning session is authorized based on header information and/or body information in the signal. For example, assume the signal is communicated as a data packet, then the computing device identifies whether the scanner is authorized to implement the scanning session of the application. The authorization may be based on the internet protocol (IP) address, a uniform resource locator (URL), or a web address of a source, destination, or other type of information identifying the scanner. Using this information signals to the computing device, foe scanning session can commence. The computing device receives the authorization of the commencement of the scanning session prior to detecting the API call as at operation 404.

At operation 404, based on the authorization of the commencement of the scanning session, the computing device monitors various API calls interacting with the application. Monitoring the various API calls, the computing device can detect the specific API call. The specific API call is the particular API call among the various API calls which indicates to the computing device to assist with the scanning session of the application. The specific API call may be predefined as the API call that signals to the computing device to assist with the scanning session. In this manner, the specific API call can act as a flag to alert the computing device to assist with the scanning session. In one implementation, if the computing device does not detect the specific API call, the computing device may continue monitoring the various API calls interacting with the application. In this implementation, the non-detection of the specific API call indicates to the computing device to not assist with f the scanning session and proceeds to operation 406. Responsive to the detection of the specific API call, the computing device may proceed to assist with the scanning session at operation 408. Proceeding to assist with the scanning session of the application, the computing device may proceed to one of the operations 408, 416, 428, and 436 based on the detected API call. For example, responsive to an API call related to a file modification, the computing device proceeds to operations 410 or 416. Responsive to the API call related to a database connection, the computing device proceeds to operations 424 or 428. Responsive to the API call as related to email, the computing device proceeds to operation 436. Operation 404 may be similar in functionality to operation 302 as in FIG. 3.

At operation 406, based upon the non-detection of the specific API call, the computing devices proceeds to monitor the various API calls interacting with foe application. Based on the computing device continuing to monitor the various API calls, the computing device docs not assist with the scanning session of the application. In this implementation, the scanning session commences, thus the computing device continues to monitor the various API calls, but the computing device may not assist with the scanning session.

At operation 408, the computing device proceeds to assist with the scanning session of the application based on the detection of the specific API call. The process of assisting the scanning session depends on the specific API call detected at operation 404 and as such the computing device proceeds to any set of operations 410-414, 416-422, 424-426, 428-434, 436-438, or any combination thereof. Operation 408 may be similar in functionality to operation 304 as in FIG. 3.

At operations 410-414, based on the specific API call as related to the file modification, the assistance to the scanning session may include skipping execution of the API call and reporting the skipped API call to the scanner. The file modification API call are those API calls which cause the application to modify a file. Implementations of the file modification API call include, by way of example, file create, file delete, file upload, file output, file write, etc. Table 1 lists a few examples of the file modification API calls in a different programming language. The parenthesis after each programming language calls the file which is to be modified. Although Table 1 illustrates Java and C# .NET, implementations should not be limited as this was done for purposes of clarifying examples of the present and disclosure and is not meant to limit the API calls to the illustrated programming languages.

TABLE 1

|  | Java | .NET |
|---|---|---|
| File Create | java.io.File.createNewFile( ) | System.IO.StreamWriter( ) |
| File Delete | java.io.File.delete( ) | System.IO.File.Delete( ) |
| File Write | java.io.FileOutputStream( ) | System.IO.FileStream( ) |
|  | java.io.FileOutputStream.write( ) | System.IO.FileStream.Write( ) |

The computing device may maintain a list of the modified files according to the file modification API calls. Thus, the computing device skips or does not execute the file modification API calls. In this implementation, data of the file modification is reported back to the scanner. This enables the scanner to identify whether the file modification may cause a vulnerability issue.

At operations 416-422, in response to specific API call as related to the file modification, assistance of the scanning session includes backing up the file prior to modification, executing the file modification API, and reverting the file to the state prior to modification. At operations 416-422, a unique identification is assigned to each file modification. Each unique identification mas also be transmitted to the scanner. If the unique identification(s) are transmitted to the scanner, the scanner may decide when to revert the file to the state prior to modification. In an implementation the reversion of the file to the state prior to the execution of the API call is carried out when a session or timer expires. If the scanner decides to revert the file at a later lime, care is taken to determine if the file has been additionally modified by another entity before reverting the file. In this implementation, the file hash or checksum is calculated prior to reversion to ensure the file has not been modified between the times.

At operations 424-426, in response to the specific API call as related to the database connection of the application, the computing device proceeds to direct the specific API call to a testing database. The computing device intercepts the specific API call which opens a database connection and redirects the database connection to the testing database. For example, assume the scanning session is in process, thus the scanner may transmit the request for the scanning session, while the computing device calls the API call to open the database connection. The computing device intercepts this API call to open the database connection and redirects die API call for execution at the testing database. In this manner, the testing database serves as a database redundant to the originally intended database for execution of the API. Redirecting the API call for execution at the testing database, the computing device may intercept the API call and modify the URL to redirect to the testing database. The URL of the testing database may either be provided by a user as a configurable parameter or the testing database may be created by copying the database from the production server upon the detection of the API call. Additionally, in this implementation, the computing device maintains a mapping list to the originally intended database URL and the testing database URL.

At operation 428-434, in response to the specific API call as related to the database connection, the computing device executes the API call and reverts the database to a state prior to execution of the API. The reversion of the database may be dependent on whether the computing device supports the scanning session commenced by the scanner. For example, the computing device may execute the database connection API which includes modifying data within the database. Upon modification, the computing device reverts back to the state of the database prior to execution of the database connection API. In another example, the computing device intercepts the database connection API call(s), and assigns a unique number to the database connection. This unique number is transmitted to the scanner. Thus, the API calls which close the database connection, such as close( ) are skipped. The scanner may signal to the computing device when to revert the database back to the state prior to execution of the API call. Reverting the database to the state prior to execution of the specific API call may also be referred to as rolling back.

Alternatively, if the specific API call includes the database connection API, the specific API call is skipped. Skipping the API call means not executing the specific API call. Thus, the skipped API call is reported back to the scanner for further analysis.

At operation 436-438, if the specific API is related to email, the computing device proceeds to direct the API call to a different email address. For example, when testing a "contact" form, the computing device can change a recipient address from info@domain.com to info-scanning@ domain. com. The mapping between the original email address and the redirected email address may be a configurable parameter by a user, developer, administrator, etc. Alternatively, the computing device intercepts a low level network connection and redirects the network connection to another local port. For example, when the application is attempting to connect to mail.domain.com:25 to send email, the computing device intercepts the email connection and redirects to a different port. Thus, the computing device may drop the connection upon receipt of the email. In a further implementation, if the specific API is related to email, the computing device can intercept the email related API and skip execution of the API while reporting the email related API back to the scanner.

In other API call implementations, the computing device monitors the network activities and/or command executions. Thus, the computing device may decide whether to skip or fail execution of the API call and report the non-executed API call to the scanner. For example, the computing device may be configured to fail the execution and returns an error when dealing with an out-of-bound network connection to backend.domain.com:443 is made. This disables the scanning of the corresponding page, but allows a reconfiguration such that the execution of the network connection may be made at a later time.

At operation 440, the computing device identifies the modification to the application based on the scanning session. Based on performing one of the sets of operations 410-414, 416-422, 424-426, 428-434, or 436-438 corresponding the specific API call, the computing device identifies lire modification to the application. Operation 440 may be similar in functionality to operation 306 as in FIG. 3.

Figure 5:
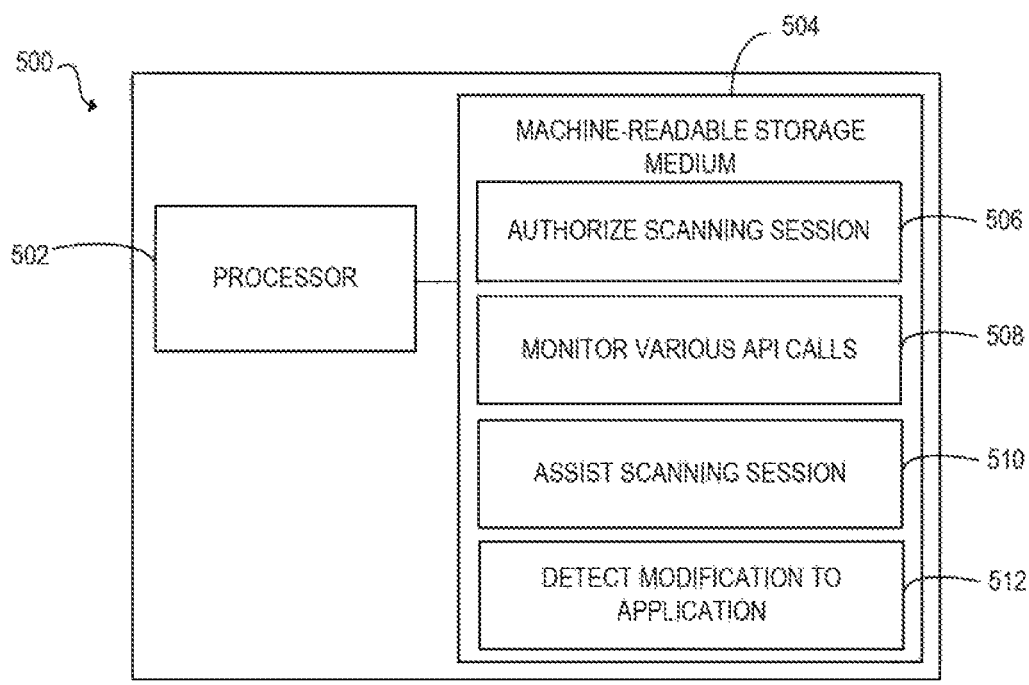
FIG. 5 is a block diagram of an example computing device with a processing resource to execute instructions in a machine-readable storage medium for detecting a modification to an application in accordance with the present disclosure.

FIG. 5 is a block diagram of computing device 500 with a processing resource 502 to execute instructions 506-512 within a machine-readable storage medium 504. Although the computing device 500 includes processing resource 502 and machine-readable storage medium 504, it may also include other components that would be suitable to one skilled in the art. For example, the computing device 500 may include a controller, memory storage, or other suitable type of component. The computing device 500 is an electronic device with the processing resource 502 capable of executing instructions 506-512 and as such embodiments of the computing device 500 include a networking device, server, switch, router, mobile device, desktop computer, or other type of electronic device capable of executing instructions 506-512. The instructions 506-512 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-512 detect a specific API call and assist in a process of a scanning session. Specifically, the processing resource 502 executes instructions 506-512 to: authorize the scanning session; monitor various API calls which interact with the application for detection of the specific API call among the various API calls; assist with the scanning session of the application based on the detection of the specific API call; and detect the modification to the application.

The machine-readable storage medium 504 includes instructions 506-512 for the processing resource 502 to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processing resource 502 to fetch, decode, and/or execute instructions of the machine-readable storage medium 504. The application and/or firmware may be stored on the machine-readable storage medium 504 and/or stored on another location of the computing device 500.

Figure 6:
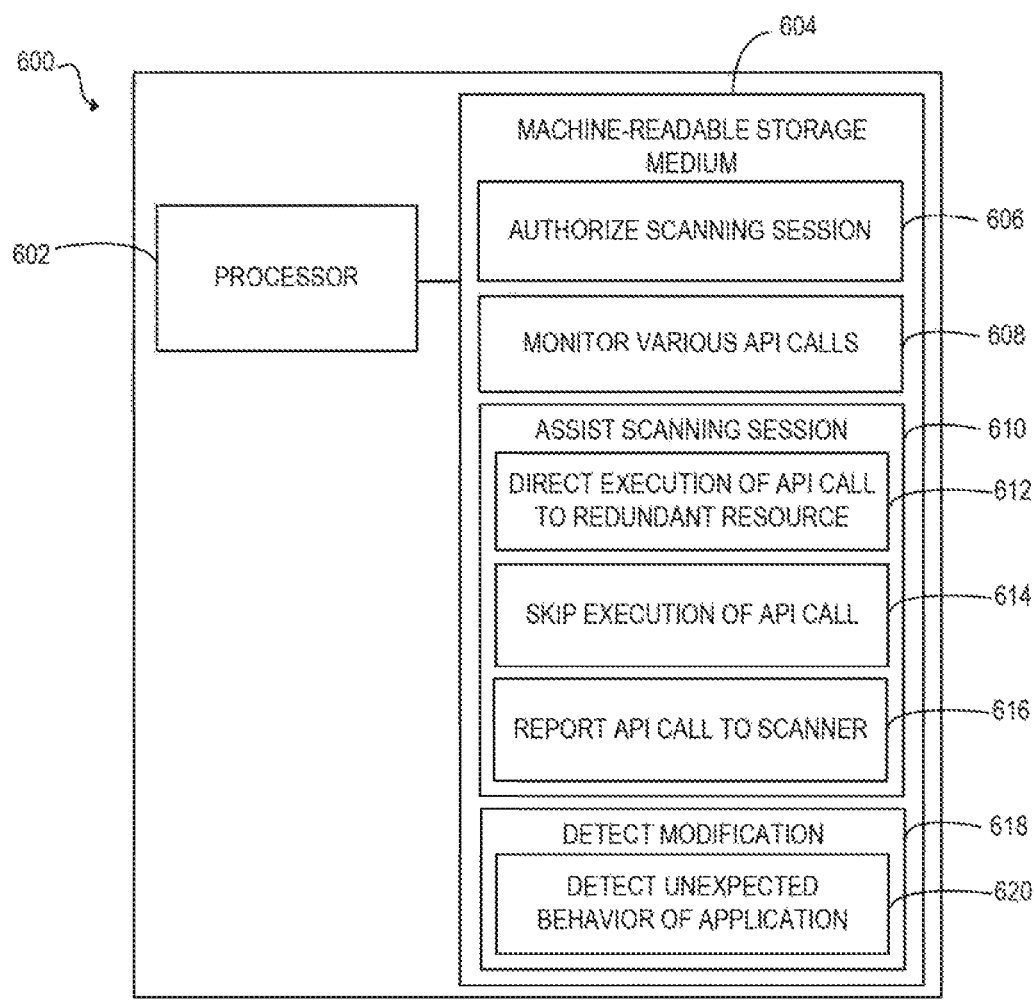
FIG. 6 is a block diagram of an example computing device with a processing resource to execute instructions in a machine-readable storage medium for assisting with a scanning session of an application for detection of a modification to the application in accordance with the present disclosure.

FIG. 6 is a block diagram of computing device 600 with a processing resource 602 to execute instructions 606-620 within a machine-readable storage medium 604. Specifically, the computing device 600 with the processing resource 602 is to detect a modification to an application based on assistance to a scanning session. Although the computing device 600 includes processing resource 602 and machine-readable storage medium 604, it may also include other components that would be suitable to one skilled in the art. For example, the computing device 600 may include a controller, memory storage, or other suitable type of component. The computing device 600 is an electronic device with the processing resource 602 capable of executing instructions 606-620 and as such embodiments of the computing device 600 include a networking device, server, switch, router, mobile device, desktop computer, laptop, or other type of electronic device capable of executing instructions 606-620. The instructions 606-620 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-620 to detect the modification to the application. Specifically, the processing resource 602 executes instructions 606-620 to: authorize performance of a scanning session; monitor various API calls for the detection of a specific API call; assist the scanning session depending on the specific API call detected, for example, the processor 602 may fetch and execute instruction 612 or instructions 614-616; direct execution of the specific API call to a redundant resource; skip execution of the specific API call and to report the skipped API call; and detect modification of the application.

The machine-readable storage medium 604 includes instructions 606-620 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processing resource 602 to fetch, decode, and/or execute instructions of the machine-readable storage medium 604. The application and/or firmware may be stored on the machine-readable storage medium 604 and/or stored on another location of the computing device 600.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

We claim:

1. A method, executable by a networking device comprising a physical processor implementing machine readable instructions, the method comprising:
    detecting, using the physical processor, a specific application programming interface (API) call from an application running on a production server to interact with the application;
    determining, using the physical processor, whether the detected specific API call requires assisted scanning, wherein an occurrence of a first detected specific API call triggers assisted scanning and an occurrence of a second detected specific API call does not trigger assisted scanning;
    responsive to the detected specific API call being an occurrence of the first detected specific API call, assisting, using the physical processor, a scanning session of the application based on the detecting of the specific API call; and
    identifying, using the physical processor, a modification to the application based on the scanning session.

2. The method of claim 1 comprising:
    receiving, using the physical processor, an authorization of the scanning session prior to detecting the API call.

3. The method of claim 1 wherein the first detected specific API call includes a file modification API, and wherein assisting the scanning session of the application based on the file modification API comprises:
    skipping, using the physical processor, execution of the file modification API; and
    reporting, using the physical processor, the skipped execution of the file modification API to a scanner.

4. The method of claim 1 wherein the first detected specific API call includes a file modification API, and wherein assisting the scanning session of the application based on the file modification API comprises:

backing, using the physical processor, up a file affected by the file modification API;
executing, using the physical processor, the file modification API; and
reverting, using the physical processor, the file affected by the file modification API to a state prior to execution of the file modification API.

5. The method of claim 1 wherein the first detected specific API call includes a database connection API, and wherein assisting the scanning session of the application based on the database connection API comprises:
directing, using the physical processor, the database connection API to a testing database, the testing database is a redundant database for execution of the database connection API.

6. The method of claim 1 wherein the first detected specific API call includes a database connection API, and wherein assisting the scanning session of the application based on the database connection API comprises:
executing, using the physical processor, the database connection API;
modifying, using the physical processor, a database based on the execution of the database connection API; and
reverting, using the physical processor, the database to a state prior to the modification of the database.

7. The method of claim 1 wherein the first detected specific API call includes an email related API, and wherein assisting the scanning session of the application based on the email related API comprises:
directing the email related API to a different email address.

8. The method of claim 1 wherein detecting the specific API call to interact with the application running on the production server comprises:
monitoring various API calls for the detecting of the specific API call.

9. The method of claim 1 wherein the detected specific API call includes at least one of a file modification API and a database connection API.

10. The method of claim 1 wherein an action associated with the assisting is determined based on a type of the detected specific API call, and wherein the action comprises at least one of: receiving an authorization of the scanning session, skipping an execution of an API, backing up a filed affected by an API, directing an API, reverting a database, and directing an API to a different email address.

11. The method of claim 1 wherein at least two actions associated with the assisting are determined based on a type of the detected specific API call.

12. A system to detect a specific application programming interface (API) call for providing assistance to a scanning session, the system comprising:
a scanner to:
perform the scanning session of an application;
a production server running the application, the production server comprising:
a security agent to:
detect a specific application programming interface (API) call from the scanner;
determine a type of the detected specific API call, wherein first and second types of detected specific API calls require performance of different first and second sets of operations, respectively;
based on the determination that the detected specific API call is the first type of detected specific API, provide assistance to the scanning session of the application in accordance with a first set of operations; and
detect a modification to the application based on the scanning session.

13. The system of claim 12 further comprising:
a redundant resource, communicatively coupled to the production server, to execute the detected specific API call.

14. The system of claim 12 wherein the security agent is to:
authorize the scanning session; and
monitor various API calls for the detection of the specific API call.

15. The system of claim 12 wherein the type of detected specific API call corresponds to a functionality of the application, wherein the first and second sets of operations comprise different ones of: receiving an authorization of the scanning session, skipping an execution of an API, backing up a file affected by an API, directing an API, reverting a database, and directing an API to a different email address.

16. The system of claim 12, wherein the first detected specific API call includes a file modification API and wherein the production server:
skips execution of the file modification API; and
reports the skipped file modification API to the scanner.

17. The system of claim 12, wherein the first detected specific API call includes a file modification API and wherein the production server:
backs up a file affected by the file modification API;
executes the file modification API; and
reverts the file affected by the file modification API to a state prior to execution of the file modification API.

18. The system of claim 12, wherein the first detected specific API call includes a database connection API, and wherein the production server:
directs the database connection API to a testing database, the testing database is a redundant database for execution of the database connection API.

19. The system of claim 12, wherein the first detected specific API call includes a database connection API, and wherein the production server:
executes the database connection API;
modifies a database based on the execution of the database connection API; and
reverts the database to a state prior to the modification of the database.

20. A non-transitory machine-readable storage medium comprising instructions that when executed by a physical processing resource cause a computing device to:
monitor various application programming interface (API) calls to interact with an application for detection of a specific API call;
based on the detection of the specific API call, assist with a scanning session related to the detected specific API call;
detect a modification to the application;
skip execution of the API call; and
report the skipped execution of the API call to a scanner.

* * * * *